United States Patent [19]

Grover et al.

[11] 4,386,759
[45] Jun. 7, 1983

[54] LINE TRANSPORTER

[75] Inventors: Mark D. Grover, 1700 Spanish Canyon Dr., Ukiah, Calif. 95482; Gary B. Moore, Ukiah, Calif.

[73] Assignee: Mark D. Grover, Ukiah, Calif.

[21] Appl. No.: 277,261

[22] Filed: Jun. 25, 1981

[51] Int. Cl.³ .............................................. H02G 1/02
[52] U.S. Cl. ................................................ 254/134.5
[58] Field of Search ................. 254/134.5, 134.3 R, 254/134.3 CL, 134.3 PA, 394, 311, 408; 182/10; 226/168, 186, 183; 242/154; 105/148, 153, 154

[56] References Cited

U.S. PATENT DOCUMENTS

| | | | |
|---|---|---|---|
| 798,602 | 9/1905 | Detchon | 254/134.5 |
| 3,044,749 | 7/1962 | Dilday | 254/134.5 |
| 3,698,326 | 10/1972 | Schurch et al. | 105/153 |
| 4,014,516 | 3/1977 | Jacks | 254/134.5 |
| 4,318,346 | 3/1982 | Sessum | 105/153 |

*Primary Examiner*—Robert C. Watson
*Attorney, Agent, or Firm*—Thomas R. Berthold

[57] ABSTRACT

A remotely controlled transporter for moving a new line across an existing cable strung over a natural or manmade barrier. The transporter includes a forward drive wheel engaged beneath the strung cable and a rear drive wheel engaged above the strung cable. In one embodiment, the counter-rotating drive wheels are driven by a chain drive connected to a main drive gear which receives its power from a motor drive shaft. The center of gravity of the transporter is located below and behind the midpoint of an imaginary line between the shafts of the two drive wheels so that the weight of the transporter generates a torque which urges the drive wheels into contact with the strung cable, thereby providing traction for the drive wheels.

11 Claims, 4 Drawing Figures

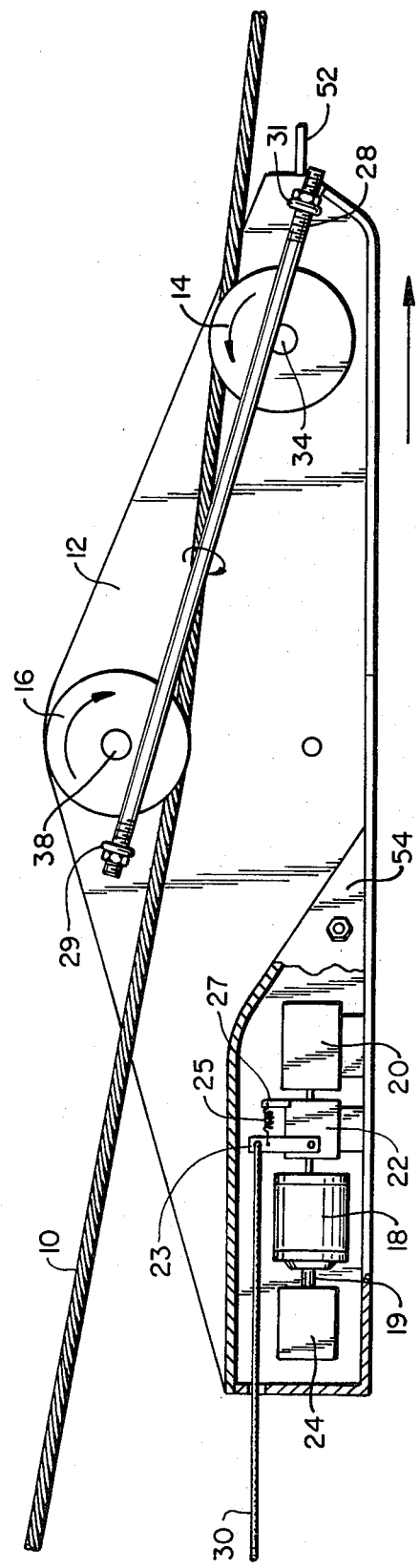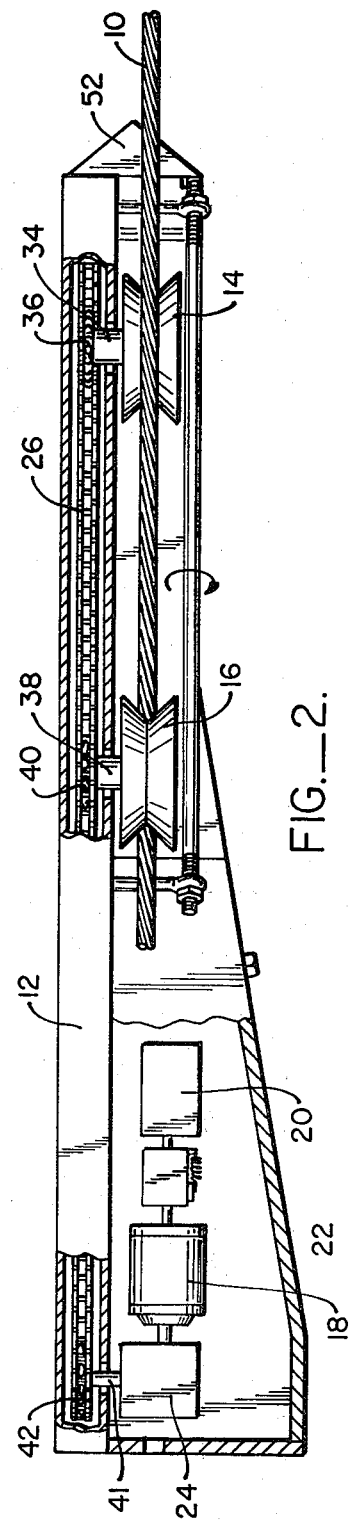

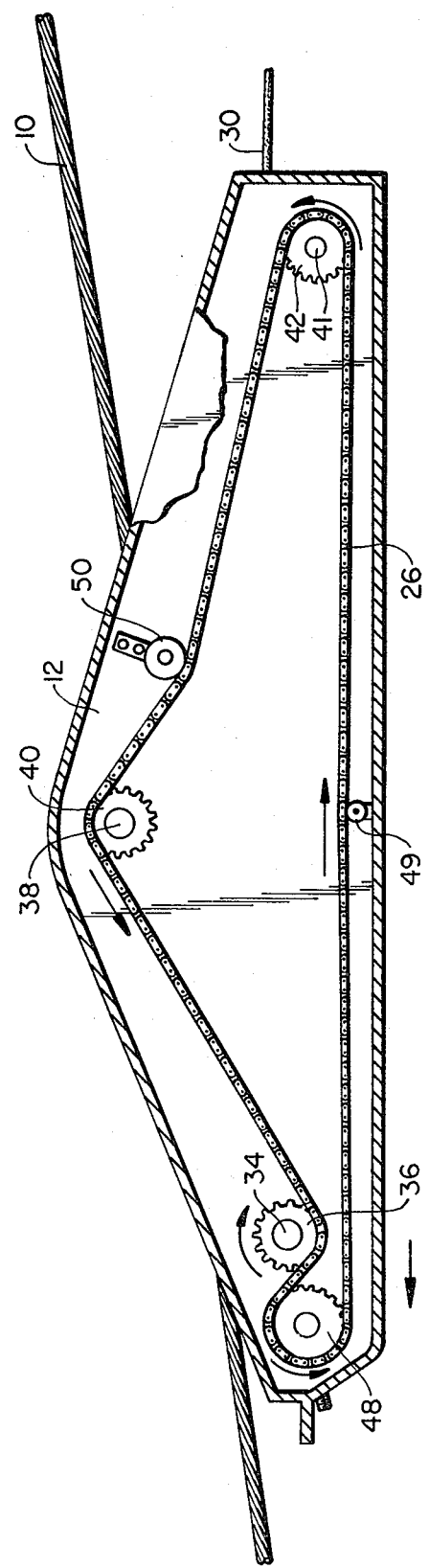
FIG._3.

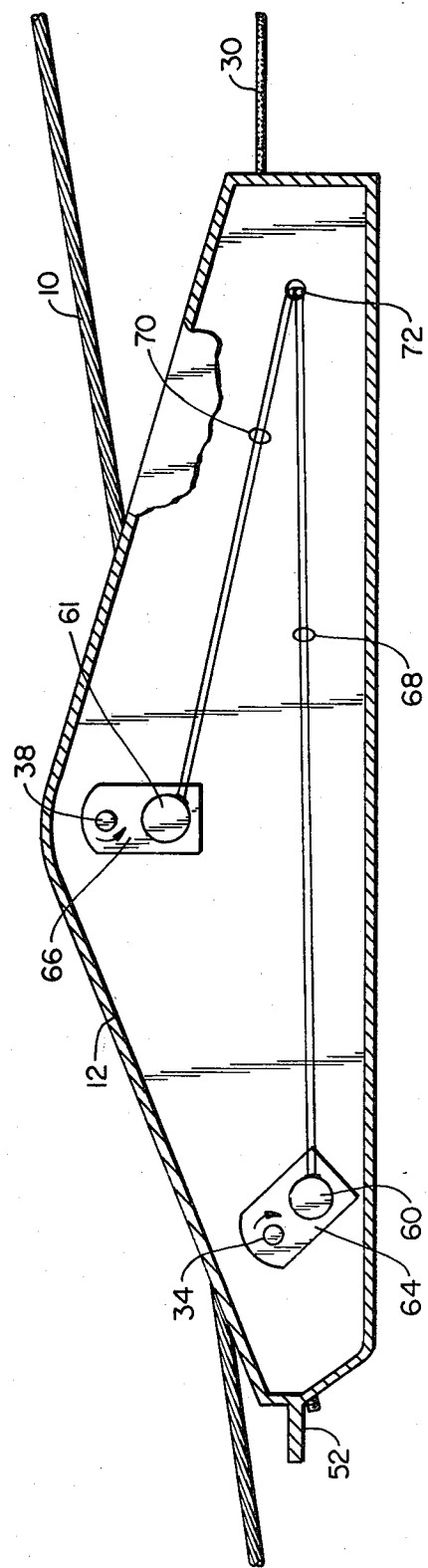
FIG._4.

LINE TRANSPORTER

BACKGROUND OF THE INVENTION

This invention relates to devices for transporting a line or other object from one end of a strung cable to the other end in order to span barriers between the cable ends.

In the stringing of new telephone, power or other cables or lines, such as cable television lines, it is often necessary to span manmade or natural barriers, such as freeways, ravines or rivers, between existing tower or poles. One method of spanning the barrier to string a new line is to fire a projectile connected to a leader across the barrier. The projectile is then retrieved, placed on the pole on the opposite side of the barrier, and the leader, which is then connected to the new cable or line, is pulled by means of winch across the barrier. When spanning other types of barriers, such as a freeway, traffic is stopped and the leader carried across the freeway to the other pole.

The invention is a remotely controlled device which drives along an existing cable and carries the line or leader to the pole on the opposite side of the barrier. Several types of remotely activated line carriers or transporters are known. For example, U.S. Pat. No. 4,014,516 to Jacks, U.S. Pat. No. 1,569,521 to Milton and U.S. Pat. No. 628,994 to Schottle, et al, disclose self-propelled cable driving devices which utilize at least three pulleys or wheels and a spring-activated mechanism to urge the wheels into contact with the cable. The prior devices, because of their use of three wheels and the spring-activated mechanism, present difficultly in driving across splices in the line because of their lack of streamlined construction, and are frequently halted in their movement by certain obstacles, such as tree limbs or branches, in the vicinity of the strung cable.

SUMMARY OF THE INVENTION

The invention includes a pair of counter-rotating drive wheels, one spaced above and one below the strung cable, at least one motor, a drive train connecting the motor to the drive wheels, a power supply, and means for controlling the supply of power to the motor. The center of gravity of the device is located below and behind the midpoint between the two drive wheels, so that the weight of the device alone is sufficient to urge the two drive wheels into engaging contact with the strung cable. Preferably, the motor, power supply and power supply control means are located in the lower rear portion of the device, to thereby place the center of gravity in the desired location. The device is constructed with a streamlined housing having converging rear and forward portions to facilitate travel past obstacles in the way of the strung cable. In an alternative embodiment, each drive wheel is directly driven by its own motor and the two motors are powered by a single power supply.

A rotatable safety bar, located approximately between the shafts on which the two drive wheels are located but extending outwardly from the drive wheels, acts to both prevent the device from jumping the cable and to facilitate in the return of the cable to the drive wheels. As is shown herein, because of the use of two drive wheels which do not move relative to one another, the device is better able to travel across splices in the line than the prior devices. Further, since only two wheels are used, the device can be constructed in a more streamlined fashion, thereby facilitating its travel through obstacles in the way of the strung cable.

For a fuller understanding of the nature and advantages of the invention, reference should be made to the following detailed description taken in conjunction with the accompanying drawings.

BRIEF DESCRIPTION OF THE DRAWINGS

FIG. 1 is a side view in partial cutaway showing the line transporter driving across an existing cable;

FIG. 2 is a top view in partial cutaway of the line transporter;

FIG. 3 is a side view in partial cutaway of the back side of the line transporter shown in FIG. 1; and FIG. 4 is a side view in partial cutaway showing an alternative embodiment with two motors.

DESCRIPTION OF THE PREFERRED EMBODIMENTS

This invention is a transporter for travelling along an existing cable, such as cable 10, which is strung between poles extending over natural or manmade barriers, in order to carry a new line across the barrier. The transporter comprises generally a housing 12 to which is attached a front drive wheel 14 located below cable 10, a rear drive wheel 16 located above cable 10, means for driving drive wheels 14 and 16, such as motor 18 located in the rear portion of the housing, and a drive train such as a chain 26 (FIG. 3), interconnecting motor 18 to drive wheels 14 and 16. Referring to FIG. 1, it will be noted that the drive shaft 19 of motor 18 is connected to a conventional right angle gear reduction unit 24 which simultaneously reduces the rotational speed of motor 18 and converts its power to the output power of a shaft located at a right angle to that of drive shaft 19. Motor 18 receives its power from a power supply unit 20, which in one embodiment may be a conventional rechargeable battery pack. Electrically coupled between motor 18 and power supply 20 is a power supply controller 22. Controller 22 may be a conventional four-position rotary switch having positions of "forward," "off" "reverse" and "off." Controller 22 may also include conventional means for varying the amount of current from power supply 20 to motor 18 so as to make the line transporter a variable speed device. As shown in FIGS. 1 and 2, one means of operating controller 22 is by means of the line 30, which is the line (or leader) to be pulled by the transporter and which trails out from the rear of the housing 12 of the line transporter. Line 30 is held by an operator on the pole from which the line transporter is first released. Line 30 is used to activate the switch on controller 22. Line 30 is attached to an arm 23 which is the manual switching mechanism for controller 22. A spring 25 is secured at one end to a fixed bracket 27 on controller 22 and attached at its other end to movable arm 23. Spring 25 returns arm 23 to its nominal position after it has been activated. While the power supply controllr 22, in the embodiment shown in FIG. 1, has been depicted as a four-position switch, it should be apparent that the unit could also operate by remote radio transmission. In such an embodiment, a radio receiver would be connected to a conventional switching unit located between motor 18 and power supply 20. Signals sent from a transmitter held by the operator would control the power supply controller 20 to either reverse the direction of motor 18 or to provide a variable supply of current in the event it is desired to have a line transporter with variable speed possiblity. In one embodiment motor 18 and power supply 20 comprise a conventional hand-held rechargeable electric drill, modified to fit within housing 12.

As shown in FIG. 2, drive wheels 14,16 are shaped as conventional pulleys, having generally V-shaped cross sections to provide engaging contact with cable 10. Typically, forward drive wheel 14 is mounted to a rotable shaft 34 through a wall of housing 12. Connected to the opposite end of shaft 34 is a gear 36 to which is connected drive chain 26. In like manner, rear drive wheel 16 is connected to rotatable shaft 38 through a wall of housing 12. On the opposite end of shaft 38 is a gear 40 connected to drive chain 26.

Referring now to FIG. 3 it will be noted that the shaft 41 of gear reduction unit 24 is connected to a main drive gear 42. Located on the forward end of housing 12 is a rotatable gear 48 mounted within housing 12. As shown in FIG. 3, chain 26 interconnects drive gear 42, gear 48, gear 36 connected to drive wheel 14, and gear 40 connected to drive wheel 16. Conventional rollers or bearings 49, 50 are located on housing 12 at approximately the midpoint of the two longest segments of chain 26 to provide tension. As shown by the arrows in FIG. 3, motor 18 causes rotation of drive gear 42, which in turn causes gears 36 and 38 to rotate in opposite directions, therby driving wheels 14, 16 in opposite directions.

Referring again to FIG. 1, the portions of the line transporter providing substantial contribution to the total weight, namely motor 18, power supply 20 and gear reduction unit 24, are located in the lower rear portion of housing 12. By such loation of these heavy elements of the line transporter, the center of gravity of the line transporter is located below and behind the midpoint of an imaginary line between the shafts 34,38 of drive wheels 14 and 16 respectively. This preselected positioning of the center of gravity provides a torque about the center of gravity which urges forward wheel 14 upward into engaging contact with cable 10 and rear drive wheel 16 downward into engaging contact with cable 10. By virtue of this design, the use of tension springs or other active devices to provide traction between the drive wheels and the cable is eliminated. More importantly, since the traction between drive wheels 14 and 16 and cable 10 remains substantially constant because of the location of the center of gravity of the transporter, when the transporter approaches a splice in the line the movement of the transporter across the splice is not retarded, as often occurs in units in which the traction on the drive wheels is increased by springs when the units contact a splice. In the line transporter of the present invention, when the line transporter approaches a splice in the line, the transporter merely rotates slightly about its center of gravity until the splice has passed beyond read drive wheel 16, at which time it returns to its normal position.

Referring again to FIG. 1, the unit includes a rotatable safety bar 28 which is located approximately between shafts 34 and 38 of drive wheels 14 and 16, and spaced outwardly from housing 12. Bar 28 is rotatable about its longitudinal axis and is mounted at its ends by either conventional bearing supports or eye-bolts 29, 31 having diameters slightly greater than the diameter of bar 28 to permit free rotation therein. The operation of safety bar 28 in the event cable 10 becomes dislodged from one of the drive wheels can be better understood by referring to FIG. 2. In the event cable 10 should become disengaged from forward drive wheel 14 and lodged between drive wheel 14 and safety bar 28, the forward direction of the line transporter would be reversed. This reversal would cause drive wheel 14 to rotate clockwise (in FIG. 1) which would thereby attempt to urge cable 10 upward and back into engaging contact with drive wheel 14. Because safety bar 28 is free to rotate, when the direction of the transporter is reversed in this manner, cable 10 is facilitated in its movement upward from between safety bar 28 and drive wheel 14. The same mode of operation of bar 28 would function to facilitate restoring cable 10 to its proper position in the event it becomes disengaged from rear drive wheel 16 and lodges between safety bar 28 and drive wheel 16. Even in the event the cable cannot be restored to its proper position on drive wheel 10, safety bar 28 prevents the line transporter from falling off cable 10 so that it can be pulled back to its original position where it can be manually restored to its proper position on cable 10.

The housing of the line transporter is configured to have both forwardly converging front and rear portions. As shown in FIG. 2, the leading edge of the line transporter has a pointed nose 52 to facilitate movement past obstacles such as tree branches. Similarly, the forwardly sloping rear portion of housing 54 which covers the motor 18, controller 22, power supply 20 and gear reduction unit 24, accomplishes the same function. Housing 12 is preferably constructed of non-electrically conductive material for safety reasons when the apparatus is used near power lines.

An alternative embodiment of the present invention is shown in FIG. 4. In this embodiment, the means for driving the two wheels 14, 16 are two drive motors 60,61, respectively. Motor 60 is connected to shaft 34 of forward drive wheel 14 by means of a self-contained gear reduction unit 64. Similarly, motor 61 is connected to shaft 38 of rear drive wheel 16 by means of a self-contained gear reduction unit 66. The two motors 60,61 are connected in parallel in the electrical circuit which includes the power supply controller 22 and power supply 20. In order to allow drive wheels 14,16 to be driven in opposite directions, the motors 60, 61 are connected in the circuit in opposite polarities. The electrical connections from the controller 22 and power supply 20 on the other side of housing 12 (see FIG. 1) to the motors 60, 61 is made by means of a pair of wires 68, which attach to motor 60, and a pair of wires 70, which attach to motor 61. Wire pairs 68 and 70 are secured to the wall of housing 12 by any conventional means, such as a silicon adhesive, and then pass through an opening 72 in the wall of housing 12, for connection to controller 22 and power supply 20.

Because cable 10 is relatively inflexible, the embodiment of the invention shown in FIG. 4 will sufficiently pull line 30 without the necessity that the speeds of drive wheels 14, 16 be maintained generally equal. Thus, even if one of the drive wheels requires greater torque, e.g. because of a greater friction force encountered on a particular portion of the cable, the increased speed of the other drive wheel will not significantly hinder progression of the transporter along the cable. However, it may be desirable to provide a suitable mechanism for maintaining the speed of the two drive wheels generally equal. This could be accomplished by any conventional type of servomechanism or closed-loop feedback control system in which the rotational speed of the drive wheels is sensed and used to control the amount of current to the respective motors, thereby maintaining the speeds of the two drive wheels generally equal.

In the embodiment shown in FIG. 4, since drive motors 60, 61 are located in close proximity to their respective drive wheels, it may be necessary to provide a counterweight in the lower rear portion of the transporter, or to change the location of power supply 20, in order to ensure that the center of gravity of the transporter is located below and behind the midpoint of an imaginary line between the centers of the two drive wheels.

The above-described component parts of the first described embodiment of the line transporter can be better understood by considering their cooperation with one another during the operation of the line transporter. First, rotatable safety bar 28 is removed from housing 12 by loosening one of the eye-bolts 29, 31. The line transporter is then placed over the strung cable so that the drive wheels are in the position on cable 10 as shown in FIG. 1, after which the safety bar 28 is again reattached to housing 12. The line 30, in this case a leader which is attached at its other end to the new cable to be strung, is attached to arm 23 of controller 22 located within housing 12. If the transporter is of the embodiment utilizing a remote transmitter and a receiver, line 30 would be attached to the exterior of housing 12 by any suitable means, e.g., an eyebolt. Pulling the switch of controller 22 to its first position by use of line 30 causes the line transporter to operate, since current will now be directed from power supply 20 to motor 18. This in turn causes drive shaft 19 to rotate, and therewith main drive gear 42 connected to gear reduction unit 24. Correspondingly, drive wheels 14 and 16 will rotate in the manner indicated by the arrows in FIG. 1 and the line transporter will move forward along the strung cable 10. As previously discussed, because the center of gravity of the device is below and behind the midpoint of an imaginary line between the shafts of the two drive wheels, the respective drive wheels are urged into engaging contact with strung cable 10 and sufficient traction is provided to drive the line transporter forward. In the event the line transporter approaches a splice in the line, which is an enlarged portion of cable 10, the respective drive wheels will rotate over it with no additional traction applied so that there is less possibility of the splice causing the line transporter to stop. Because of the forwardly converging front and rear portions of the line transporter, the unit moves relatively freely past any obstacles, such as tree branches, which may be in the vicinity of the strung cable. However, in the event that the transporter does become entangled or otherwise has its forward movement retarded, line 30 can be pulled to move the switch of controller 22 to its reverse position, thereby reversing the direction of the drive wheels to cause the line transporter to move off the obstacle, after which another attempt can be made. Also, in the event the transporter becomes disengaged from cable 10, in the manner as previously discussed, an attempt can be made to re-engaged it with the strung cable, which is facilitated by rotatable safety bar 28. However, in the event the transporter becomes completely disengaged from the cable, it will be held by safety bar 28. When the transporter reaches the opposite side of the barrier, the line 30 is removed and attached to a winch or similar device which then pulls the line 30 and ultimately the new cable across the barrier.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. An apparatus for transporting a line or other object from one end of a strung cable to the other end by driving along the cable, the apparatus comprising:
   a housing;
   a least one motor having a drive shaft;
   a power supply;
   means for controlling the supply of power to the motor, said motor, power supply and control means being mounted on the housing;
   a first drive wheel rotatably mounted to the forward portion of the housing for contacting the underside of the cable, a second drive wheel rotatably mounted to the housing behind said first drive wheel for contacting the top side of the cable, said drive wheels being oriented in substantially the same plane of rotation and being urged into engaging contact with the cable by the weight of the apparatus;
   means interconnecting said at least one motor and said drive wheels for rotating said drive wheels in opposite directions, thereby driving the apparatus along the cable; and
   means for attaching a line or other object to the housing.

2. The apparatus according to claim 1 wherein the forward portion of the housing converges in a generally forward direction to thereby facilitate the travel of the apparatus past obstacles in the vicinity of the cable.

3. The apparatus according to claim 1 wherein said motor and power supply are located inside the rear portion of the housing, and wherein said rear portion of the housing converges in a generally forward direction to facilitate movement of the apparatus past obstacles in the vicinity of the cable.

4. The apparatus according to claim 1 wherein said housing is constructed of non-electrically-conductive material.

5. The apparatus according to claim 1 wherein said power supply controlling means includes means for varying the speed of the motor to thereby control the speed of the apparatus along the cable.

6. The apparatus according to claim 1 wherein said power supply controlling means includes a manual switch electrically coupled between the power supply and the motor and means connected to the manual switch and extending from the housing for remote activation of the switch.

7. The apparatus according to claim 1 further comprising means on said housing for preventing disengagement of said drive wheels from the cable.

8. The apparatus according to claim 7 wherein said means for preventing disengagement of said drive wheels from the cable further comprises a rod connected to said housing and extending substantially between said drive wheels, said rod being spaced outwardly from said drive wheels and being rotatable about its longitudinal axis, whereby when the cable becomes disengaged from one of the drive wheels and is forced into contact between said rod and said one drive wheel, the re-engagement of the cable with said one drive wheel may be facilitated by reversing the direction of rotation of the motor drive shaft and therewith the direction of rotation of said drive wheels.

9. The apparatus according to claim 1 including two drive motors, each of said motors being directly mechanically coupled to a respective drive wheel.

10. The apparatus according to claim 9 including means coupled between said power supply and said motors for maintaining the speed of said motors generally equal.

11. The apparatus according to claim 9 wherein said motor and drive wheel interconnecting means further comprises two gear reduction units, each of said units being connected between a drive motor and its corresponding drive wheel.

* * * * *